United States Patent
Jia et al.

(10) Patent No.: US 9,614,843 B2
(45) Date of Patent: Apr. 4, 2017

(54) CONTEXT-AWARE ADAPTIVE AUTHENTICATION METHOD AND APPARATUS

(75) Inventors: Xu Jia, Beijing (CN); Huanhuan Cao, Beijing (CN); Jilei Tian, Beijing (CN); Ying Liu, Beijing (CN)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/374,202

(22) PCT Filed: Mar. 8, 2012

(86) PCT No.: PCT/CN2012/072083
§ 371 (c)(1),
(2), (4) Date: Jul. 23, 2014

(87) PCT Pub. No.: WO2013/131265
PCT Pub. Date: Sep. 12, 2013

(65) Prior Publication Data
US 2014/0337945 A1 Nov. 13, 2014

(51) Int. Cl.
*G06F 21/00* (2013.01)
*H04L 29/06* (2006.01)
(Continued)

(52) U.S. Cl.
CPC .......... *H04L 63/0876* (2013.01); *G06F 21/31* (2013.01); *G06F 21/32* (2013.01); *G06F 2221/2111* (2013.01)

(58) Field of Classification Search
CPC .................................................. H04L 63/0876
See application file for complete search history.

(56) References Cited

U.S. PATENT DOCUMENTS 7,400,878 B2  7/2008 Hassan et al.
7,869,789 B2  1/2011 Hassan et al.
(Continued)

FOREIGN PATENT DOCUMENTS

CN  1666457    9/2005
CN  101242629  8/2008
(Continued)

OTHER PUBLICATIONS

"KDE: Location-Based Screen Lock Activation", Braindump, Retrieved on Sep. 23, 2014, Webpage available at : https://blog.ginkel.com/2011/06/kde-location-based-screen-lock-activation/.
(Continued)

*Primary Examiner* — Brandon Hoffman
*Assistant Examiner* — Helai Salehi
(74) *Attorney, Agent, or Firm* — Mintz Levin Cohn Ferris Glovsky and Popeo, P.C.

(57) ABSTRACT

A context-aware adaptive authentication method may comprise: determining a context for a user; adjusting automatically an authentication configuration for the user based at least in part on the context, wherein different matching accuracies of an authentication algorithm for the same authentication input data are associated with respective authentication configurations; and performing an authentication of the user with the authentication configuration, wherein for the user under a safe context, the authentication is performed by decreasing a matching accuracy of the authentication algorithm.

18 Claims, 3 Drawing Sheets

(51) Int. Cl.
*G06F 21/31* (2013.01)
*G06F 21/32* (2013.01)

(56) References Cited

U.S. PATENT DOCUMENTS

| | | |
|---|---|---|
| 8,621,656 B2 | 12/2013 | Miettinen et al. |
| 2005/0154926 A1 | 7/2005 | Harris |
| 2005/0193144 A1* | 9/2005 | Hassan ............... G06F 21/31 709/238 |
| 2008/0172715 A1 | 7/2008 | Geiger et al. |
| 2010/0162386 A1* | 6/2010 | Li ........................ G06F 21/32 726/19 |
| 2012/0079086 A1 | 3/2012 | Miettinen |
| 2012/0079570 A1 | 3/2012 | Fu et al. |
| 2012/0185910 A1* | 7/2012 | Miettinen ............ G06F 21/31 726/1 |
| 2012/0271913 A1* | 10/2012 | Tallgren ............... H04W 24/00 709/217 |

FOREIGN PATENT DOCUMENTS

| | | |
|---|---|---|
| CN | 101257385 | 9/2008 |
| CN | 102255727 | 11/2011 |
| WO | 2013/056407 A1 | 4/2013 |
| WO | WO-2013059464 A1 | 4/2013 |
| WO | 2013/123646 A1 | 8/2013 |

OTHER PUBLICATIONS

"Pattern Lock by Location for the Samsung Galaxy S II", Talk Android, Retrieved on Sep. 23, 2014, Webpage available at : http://www.talkandroid.com/44758-pattern-lock-by-location-for-the-samsung-galaxy-s-ii/#.TthLvrK4g98.

Hulsebosch et al., "Context-Based Authentication Evaluation and Outlook", Freeband Awareness, Mar. 2008, pp. 1-5.

International Search Report received for corresponding Patent Cooperation Treaty Application No. PCT/CN2012/072083, dated Dec. 13, 2012, 3 pages.

\* cited by examiner (a) (b)

CONTEXT-AWARE ADAPTIVE AUTHENTICATION METHOD AND APPARATUS

RELATED APPLICATION

This application was originally filed as PCT Application No. PCT/CN2012/072083 filed Mar. 8, 2012.

FIELD OF THE INVENTION

The present invention generally relates to data security. More specifically, the invention relates to a context-aware adaptive authentication.

BACKGROUND

The modern communications era has brought about a tremendous expansion of communication networks. Communication service providers and device manufacturers are continually challenged to deliver value and convenience to consumers by, for example, providing compelling network services, applications, and content. The developments of communication technologies have contributed to an insatiable desire for new functionality. Portable communication apparatuses (for example, mobile phones) are no longer just tasked with making telephone calls. With the increasing popularity and smartness of smart phones, mobile users rely on their smart phones more and more. Smart phones store various personal data such as email, message, location information, and some of them even bind a user payment account. Therefore, authentication of a user to use an apparatus such as a smart phone plays an important role in data security.

SUMMARY

The present description introduces a solution of context-aware adaptive authentication, which can intelligently adjust authentication configurations of a user for different contexts and trade off the convenience and security as the user's context changes.

According to a first aspect of the present invention, there is provided a method comprising: determining a context for a user; adjusting automatically an authentication configuration for the user based at least in part on the context, wherein different matching accuracies of an authentication algorithm for the same authentication input data are associated with respective authentication configurations; and performing an authentication of the user with the authentication configuration, wherein for the user under a safe context, the authentication is performed by decreasing a matching accuracy of the authentication algorithm.

According to a second aspect of the present invention, there is provided an apparatus comprising: at least one processor; and at least one memory comprising computer program code, the at least one memory and the computer program code configured to, with the at least one processor, cause the apparatus to perform at least the following: determining a context for a user; adjusting automatically an authentication configuration for the user based at least in part on the context, wherein different matching accuracies of an authentication algorithm for the same authentication input data are associated with respective authentication configurations; and performing an authentication of the user with the authentication configuration, wherein for the user under a safe context, the authentication is performed by decreasing a matching accuracy of the authentication algorithm.

According to a third aspect of the present invention, there is provided a computer program product comprising a computer-readable medium bearing computer program code embodied therein for use with a computer, the computer program code comprising: code for determining a context for a user; code for adjusting automatically an authentication configuration for the user based at least in part on the context, wherein different matching accuracies of an authentication algorithm for the same authentication input data are associated with respective authentication configurations; and code for performing an authentication of the user with the authentication configuration, wherein for the user under a safe context, the authentication is performed by decreasing a matching accuracy of the authentication algorithm.

According to a fourth aspect of the present invention, there is provided an apparatus comprising: determining means for determining a context for a user; adjusting means for adjusting automatically an authentication configuration for the user based at least in part on the context, wherein different matching accuracies of an authentication algorithm for the same authentication input data are associated with respective authentication configurations; and performing means for performing an authentication of the user with the authentication configuration, wherein for the user under a safe context, the authentication is performed by decreasing a matching accuracy of the authentication algorithm.

According to various exemplary embodiments, said determining the context for the user may comprise: collecting context information for the user; and detecting whether the user is under a safe context based at least in part on the context information. For example, the context may comprise but not limited to at least one of a place, time, a background environment, a transportation status, and the time elapsed since a previous authentication becomes invalid. The authentication may comprise but not limited to at least one of: a text-based authentication, a voice-based authentication, a pattern-based authentication, a graph-based authentication and a biometric-based authentication.

In an exemplary embodiment, said decreasing the matching accuracy of the authentication algorithm may comprise: employing a normal recognition model of the authentication algorithm for recognizing authentication input data from the user; and determining the user as valid, in response to a match between at least a part of the recognized authentication input data and a corresponding part of authentication reference data of the authentication algorithm. Particularly, the at least part of the recognized authentication input data may comprise a beginning part of the authentication input data, and in this case, the user may be determined as valid without waiting for recognizing the remaining part of the authentication input data.

In another exemplary embodiment, said decreasing the matching accuracy of the authentication algorithm may comprise: replacing a normal recognition model of the authentication algorithm with an imprecise recognition model for recognizing authentication input data from the user; and determining the user as valid, in response to a match between the recognized authentication input data and authentication reference data of the authentication algorithm. Particularly, said replacing the normal recognition model of the authentication algorithm with the imprecise recognition model may comprise at least one of: modifying one or more parameters of the normal recognition model; and reducing one or more refining processes.

According to various exemplary embodiments, in response to a failure of the authentication, a re-authentication of the user may be performed under the same context by adjusting a current authentication configuration. In an exemplary embodiment, said adjusting the current authentication configuration may comprise: increasing a current matching accuracy of the authentication algorithm. In another exemplary embodiment, said adjusting the current authentication configuration may comprise: applying another authentication algorithm which is more reliable than the authentication algorithm.

In exemplary embodiments of the present invention, the provided method, apparatus, and computer program product can enable an authentication configuration for a user to be automatically adjusted in a context-aware way, which keeps the security while improves user experiences by trading off the security under safe contexts. Particularly, the proposed solution can speed up the authentication process without causing a change of user behavior and interaction, and reduce a user's cognitive load while keeping the security performance. Moreover, if a current authentication fails, an adaptive mechanism to punish the user may be employed to further enhance the security and avoid intruded cases.

BRIEF DESCRIPTION OF THE DRAWINGS

The invention itself, the preferable mode of use and further objectives are best understood by reference to the following detailed description of the embodiments when read in conjunction with the accompanying drawings, in which.

DETAILED DESCRIPTION OF THE INVENTION

The embodiments of the present invention are described in detail with reference to the accompanying drawings. Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is comprised in at least one embodiment of the present invention. Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

With the increasing popularity and smartness of portable devices such as smart phones, mobile handsets, media players, gaming devices and so on, users rely on their portable devices more and more. An important problem is that the portable devices may store various personal data such as email, message, location information and the like. Some portable devices even bind a user payment account. Therefore, data security is very important for these devices. A security mechanism such as phone lock is widely used for data security, which ensures even a user device such as smart phone is taken by strangers, they cannot access the user's private data easily. However, some portable devices such as mobile phones may be intensively used daily, requiring a validation every time may be a burden. Some latest smart phones even take advantages of the face recognition or the finger print recognition technology to open the phone lock. The involved authentication process such as unlocking usually needs several seconds. In fact, sometimes a user actually does not need to lock the phone because the place where the user stays is safe, such as home and office. In this case, a tendency of the phone being misused is minimized. One solution is to apply a location-based lock policy in which if a user is at home, he/she may not have to lock his/her phone. However, this solution may not be secure because there is still possibility that the phone may be misused by other person instead of the user. Therefore, it may be very desirable if the authentication process can be simplified in safe places but more secure than a pure non-lock strategy. Moreover, it may be more attractive to bind authentication configurations with contexts which are more general than locations.

Figure 1:
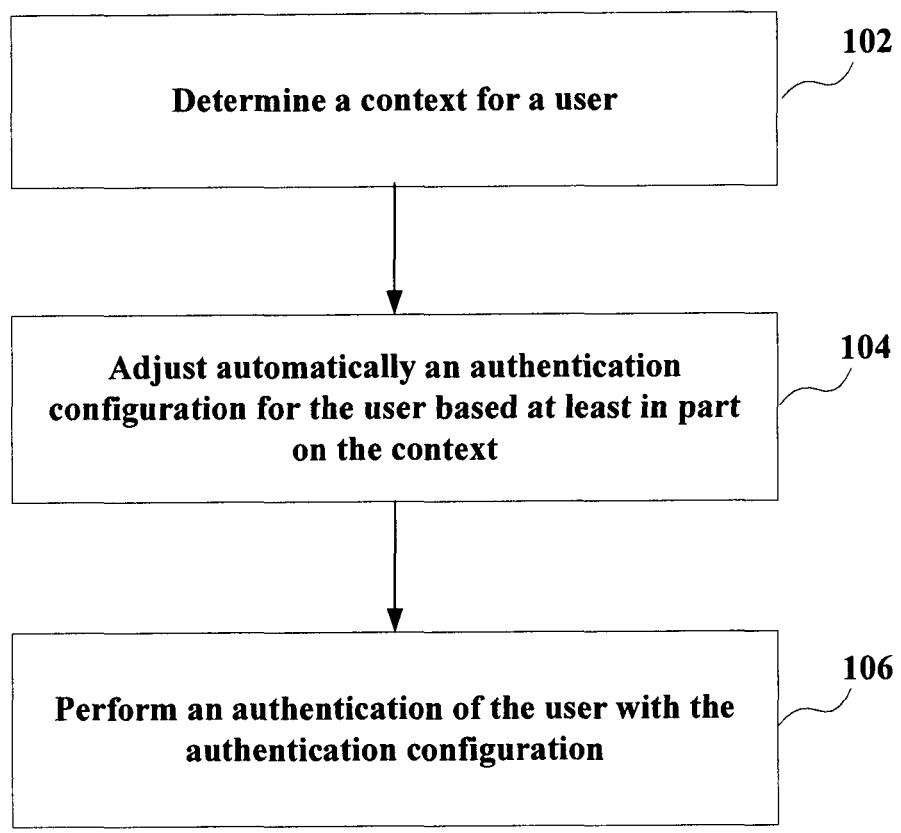
FIG. 1 is a flowchart illustrating a method for context-aware adaptive authentication in accordance with embodiments of the present invention.

FIG. 1 is a flowchart illustrating a method for context-aware adaptive authentication in accordance with embodiments of the present invention. In the illustrated embodiment, an apparatus at which the method illustrated in FIG. 1 may be implemented can be any type of fixed terminal, mobile terminal or portable terminal comprising smart phones, desktop computers, laptop computers, handsets, stations, units, devices, multimedia tablets, Internet nodes, communicators, Personal Digital Assistants (PDAs), or any combination thereof. The authentication technologies in accordance with exemplary embodiments can intelligently adjust authentication configurations (such as setting authentication strength levels, selecting matching accuracies of an authentication algorithm and etc.) for a user as the user's context changes, thereby trading off the convenience and the security based at least in part on context information of the user.

As shown in FIG. 1, the apparatus determines a context for a user in block 102. For example, the context may comprise but not limited to at least one of: a place, time, a background environment, a transportation status, and the time elapsed since a previous authentication becomes invalid (such as passing time after a phone is locked). According to an exemplary embodiment, said determining the context for the user may comprise: collecting context information for the user and detecting whether the user is under a safe context based at least in part on the context information. Safe contexts may comprise safe places, safe times, safe background environments, and the combination of them or associated with more factors, such as the transportation status. The safe contexts can be inferred by the apparatus for example based at least in part on domain knowledge. Alternatively or additionally, a user can manually define the safe contexts. In an exemplary embodiment, the apparatus may collect and model context data for the user, and determine the security strength from the user's context. Taking safe place as an example, the apparatus can learn places where the user usually stays through data mining approaches (such as Global Positioning System (GPS) trajectories or cell identity trajectories) and infer their safety. For example, some places such as home and office may be regarded as safe contexts, while other places such as restaurant and street may be regarded as unsafe contexts. In fact, safe contexts may be further classified with several security sub-levels. For example, a user may consider that home is safer than office. Similarly, the user can define some safe time which indicates the working time in office and the time at home. In an example with respect to background environments, the apparatus can detect the user's environment such as "Office", "Restaurant", "Street" and so on through the background sound. Alternatively or additionally, the time elapsed since a previous authentication becomes invalid may be considered. For example, if it is right after the apparatus is locked, the security level is lower; and if the time is longer, the security is higher.

Figure 2:
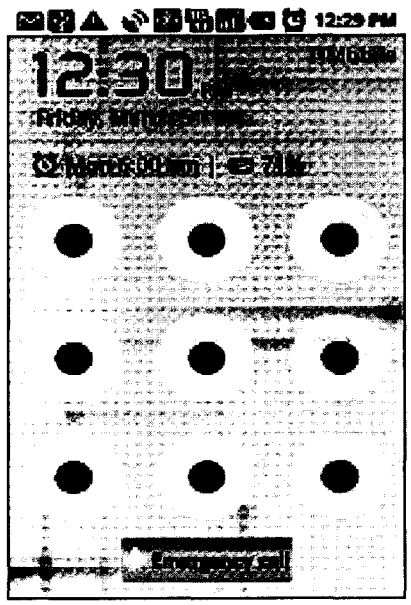
FIG. 2 shows phone lock examples in accordance with embodiments of the present invention.
Figure 2:
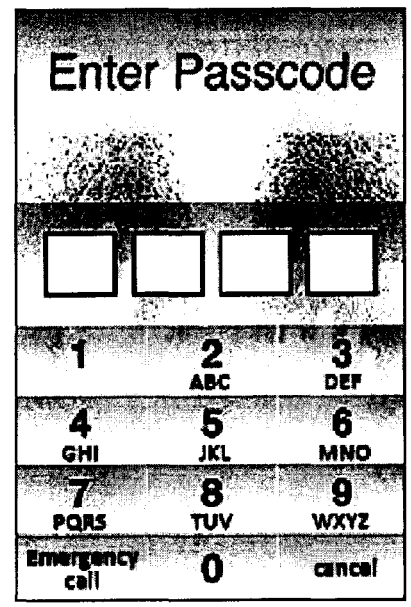

In block 104, the apparatus adjusts automatically an authentication configuration for the user based at least in part on the context, wherein different matching accuracies of an authentication algorithm for the same authentication input data are associated with respective authentication configurations. According to exemplary embodiments, an authentication may comprise but not limited to at least one of the following: a text-based authentication, a voice-based authentication, a pattern-based authentication, a graph-based authentication and a biometric-based authentication. For example, the text-based authentication may comprise a password validation in which a user may be required to enter a password such as a string of numbers, symbols, characters or any combination thereof. In the graph-based authentication, a user may have to connect all points in a correct way for validity verification. Similarly, a user may be required to speak a sound password in the voice-based authentication, draw a pattern in the pattern-based authentication, provide personal features (such as face, finger print, iris and the like) in the biometric-based authentication, and so on. FIG. 2 shows phone lock examples in accordance with embodiments of the present invention, where the left part denoted by (a) exemplarily illustrates a user interface for graph-based lock and the right part denoted by (b) exemplarily illustrates a user interface for password validation. It will be realized that although some examples are described here with respect to phone lock, the authentication solution in accordance with exemplary embodiments may be also applicable to any other security protection mode such as keypad lock, function disable and the like.

According to exemplary embodiments, different types of authentications may employ respective authentication algorithms. An authentication algorithm may have different matching accuracies when processing the same authentication input data from a user. For example, if the authentication reference data of an authentication algorithm is "1234", then for the same authentication input data "1334" from a user, the authentication algorithm with a normal matching accuracy (such as a matching accuracy of 100%) may consider the user as invalid, while the authentication algorithm with a decreased matching accuracy (such as a matching accuracy of 75%) may consider the user as valid. Different matching accuracies of the authentication algorithm may represent different authentication strength levels corresponding to respective security levels of contexts. In an exemplary embodiment, adjusting automatically the authentication configuration in block 104 may comprise adaptively setting an appropriate authentication strength level for the user, and thus the authentication configuration may be associated with a specified matching accuracy of the authentication algorithm. According to an exemplary embodiment, a lower authentication strength level may be set for a user under a safe context compared with an unsafe context, for example, by decreasing matching accuracies of the authentication algorithm employed during the authentication. This approach can tolerate some unintentional input errors from a valid user and thus save authentication time. Since safe contexts may be further classified with several security sub-levels as described above, the apparatus can select a proper matching accuracy of the authentication algorithm with respect to the security sub-level associated with the context determined for the user.

With the authentication configuration adjusted based at least in part on the determined context, the apparatus can perform an authentication of the user in block 106. Particularly, the authentication for the user under a safe context may be performed by decreasing a matching accuracy of the authentication algorithm. In an exemplary embodiment, said decreasing the matching accuracy of the authentication algorithm may comprise: employing a normal recognition model (such as a precise recognition model) of the authentication algorithm for recognizing authentication input data from the user; and determining the user as valid, in response to a match between at least a part of the recognized authentication input data and a corresponding part of authentication reference data of the authentication algorithm. Thus it can be seen that an inexact matching policy is applied when comparing the recognized authentication input data and authentication reference data during execution of the authentication algorithm. Taking text password as an example, if the reference password is 12345678 and the actual user input is 12245677, then under safe contexts, although the normal recognition model of this authentication algorithm recognizes the user input exactly as 12245677 instead of 12345678, the user still can pass the authentication because of the inexact matching policy which can tolerate an error rate of 25%. Particularly, according to an exemplary embodiment, the at least part of the recognized authentication input data may comprise a beginning part of the authentication input data. In this case, in response to a match between the beginning part of the authentication input data and a corresponding part of the authentication reference data, the user can be determined as valid without waiting for recognizing the remaining part of the authentication input data. By applying this solution, the apparatus can allow the user to only input a prefix of the password in a safe context. If the reference password set by the user is 12345678, then the user under a safe context (where the security strength/risk may be reduced to 50%) only needs to input a prefix code such as 1234 and can log in (for example, successfully unlock the apparatus right after typing in 1234), even though the user may still intend to input more. In other words, the apparatus decides a security level for the context of the user and uses a truncated reference password (for example, a prefix of the original one) as the acceptable password, while the user does not explicitly know the acceptable password has changed due to the truncation process and may still input the password as before. Thus, the user's cognitive load in this case is a single password, though the acceptable password may change for different security levels of user contexts. Similarly, in an example of sound lock, the apparatus may allow the user to speak only the beginning part of the predefined sound password under a safe context. However, if the context is determined as unsafe in block 102, the apparatus would require the user to speak out the full sound password accurately. For draw-a-pattern locks, only the beginning part of a pattern may be required to unlock the apparatus under safe contexts. If the reference pattern is like an "M", for example, the apparatus can be unlocked when the user draws "N", since the first several strokes are correct and it can be regarded as an indication of a valid user when the security level is low. If the context is not safe, the full pattern would be required, and even in a shorter time limit. It is noted that the acceptable beginning part of the authentication input data can be predefined by the apparatus and/or the user. In an exemplary embodiment, the ratio of the beginning part of the authentication input data to the whole authentication reference data may be associated with the decreased matching accuracy of the authentication algorithm.

Alternatively or additionally, said decreasing the matching accuracy of the authentication algorithm may comprise: replacing a normal recognition model of the authentication algorithm with an imprecise recognition model for recognizing authentication input data from the user; and determining the user as valid, in response to a match between the recognized authentication input data and authentication reference data of the authentication algorithm. Thus it can be seen that although an exact matching policy is applied when comparing the recognized authentication input data and the authentication reference data, the final matching accuracy of the authentication algorithm is also decreased due to use of the imprecise recognition model. According to exemplary embodiments, said replacing the normal recognition model of the authentication algorithm with the imprecise recognition model may comprise at least one of the following: modifying one or more parameters (such as input data and operational coefficients) of the normal recognition model; and reducing one or more refining processes (such as data refinement). The modification of parameters and the reduction of refining processes may rely on a matching accuracy of the authentication algorithm desired by the authentication configuration for the user under a certain context. For example, in a biometric-based authentication situation where the advanced phone lock such as face recognition or finger print recognition is used, the apparatus can only extract some simple features as inputs of the recognition model under safe contexts. These features come from raw images and do not need too much computation. In this way, the roughly recognized authentication input data may be matched well with the authentication reference data (which may collected and stored by the apparatus in advance), and thus the authentication of the user can succeed. In another example, the apparatus may collect more features of the user as inputs of the recognition model but adjust some parameters of the recognition model or even use an alternative and simpler recognition model (which does not require refined but high complexity calculation), so as to improve the recognition speed by sacrificing the rate of falsely positive (falsely recognizing a invalid user as a valid user). One of benefits brought by the above solution is in that it would cost shorter time for a user under a safe context to perform an authentication such as staying in front of a camera of a biometric-based authentication system. Under other contexts where security is more important, the apparatus may use a normal recognition model and an exact matching policy to ensure the reliability of the authentication but trade off the efficiency.

For security reasons, in response to a failure of the authentication in block 106, the apparatus may optionally perform a re-authentication of the user under the same context by adjusting a current authentication configuration. According to exemplary embodiments, said adjusting the current authentication configuration may comprise increasing a current matching accuracy of the authentication algorithm. In an embodiment of text-based authentication, given a reference password such as 12345, the user under a safe context can pass the authentication by inputting a password of 12244, if the matching accuracy of the authentication algorithm is decreased as 60%, for example. However, if the user inputs 13367, then the authentication fails because only 40% of the input password matches with the reference password. Thus, the user is required to input the password again, but this time the matching accuracy of the authentication algorithm may be increased, for example up to 80%. In another exemplary embodiment, if the reference password is predefined as 12345678, the user only needs to input a prefix of the password such as 1234 and then can log in, as described previously in connection with block 106 in FIG. 1. But if the user inputs the prefix code in a wrong way (such as 1254) and fails, then in next time he/she needs to input a longer prefix of the password (such as 123456), as the punishment. Alternatively, it may be possible to reset the required password in the re-authentication to the original reference password to avoid intruded case. It may be understand that similar situations may also occur for other types of authentications such as pattern, sound, face, and finger recognition locks, where although the beginning authentication strength is low under safe contexts, if the user fails in the first authentication, the next authentication may be performed more strictly. Alternatively, the current authentication configuration may be adjusted by applying another authentication algorithm which is more reliable than the currently used authentication algorithm. For example, some higher requirements of a biological pattern may be presented to users during the authentication, thus the user needs to speak the sound password in a higher or lower tone, or show the left and right profile of the face.

The various blocks shown in FIG. 1 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented method. Other steps and methods may be conceived that are equivalent in function, logic, or effect to one or more steps, or portions thereof, of the illustrated method. Additionally, the order in which a particular method occurs may or may not strictly adhere to the order of the corresponding steps shown. By applying the proposed context-aware authentication approach, an authentication configuration of a user device can be adjusted adaptively. For example, some safe contexts may be automatically detected by a user device or defined by a user. When the user is under a safe context, the user device can automatically adjust the authentication configuration (such as an authentication strength level, a matching accuracy of an authentication algorithm and etc.) for improving the convenience and speed of an authentication. Particularly, an adaptive mechanism may be also applied to the authentication. For example, given a beginning authentication strength level, if the authentication of the user fails, the next authentication will be performed more strictly as a penalty. With the above described solution, a device such as a smart phone may know which contexts are safe in a simple and fast way and become even smarter. For a user of the device, he/she only needs to set and remember one password, but makes an authentication in a safe context successful by correctly inputting a part of the password (such as a prefix of the password). Moreover, in the case of a biometric-based authentication such as face recognition and finger recognition, there is only one input from the user but different recognition approaches may be used for trading off the precision. Therefore, the authentication process in accordance with the exemplary embodiments can be speed up, for example by truncating authentication input data or making the authentication error-tolerant to some extent.

Figure 3:
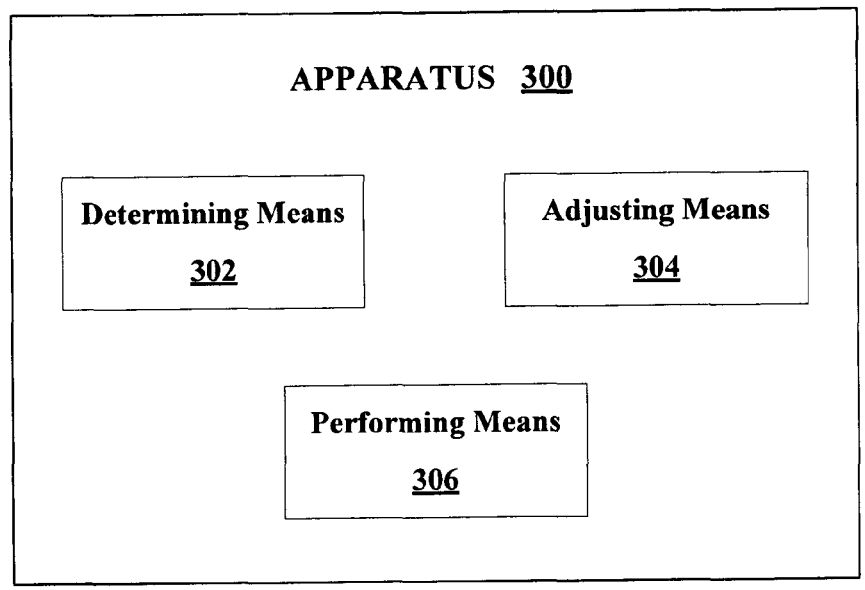
FIG. 3 is a simplified block diagram of an apparatus which is suitable for use in practicing exemplary embodiments of the present invention.

FIG. 3 is a simplified block diagram of an apparatus which is suitable for use in practicing exemplary embodiments of the present invention. The apparatus 300 shown in FIG. 3 may comprise various means, modules and/or components for implementing functions of the foregoing steps and method in FIG. 1. In an exemplary embodiment, the apparatus 300, such as a user equipment, a mobile terminal, a portable device or the like, may comprise: determining means 302 for determining a context for a user; adjusting means 304 for adjusting automatically an authentication configuration for the user based at least in part on the context; and performing means 306 for performing an authentication of the user with the authentication configuration. According to exemplary embodiments, different matching accuracies of an authentication algorithm for the same authentication input data may be associated with respective authentication configurations. For the user under a safe context, the authentication may be performed by decreasing a matching accuracy of the authentication algorithm. Optionally, the performing means 306 may be further adapted for performing a re-authentication of the user under the same context by adjusting a current authentication configuration, in response to a failure of the authentication. Alternatively, the apparatus 300 may comprise another separate module/means for implementing the function of re-authentication.

Many of the functional units described herein have been labeled as modules or means, in order to more particularly emphasize their implementation independence. For example, a module/means may be implemented as a hardware circuit or in programmable hardware devices. Modules/means may also be implemented in software for execution by various types of processors. Nevertheless, the executables of the modules/means need not be physically located together, but may comprise disparate instructions stored in different locations which, when joined logically together, comprise the modules/means and achieve the stated purpose for the modules/means. Furthermore, modules/means may also be implemented as a combination of software and one or more hardware devices. For instance, a module/means may be embodied in the combination of software executable codes stored on a memory device. In a further example, a module/means may be the combination of a processor that operates on a set of operational data. Still further, a module/means may be implemented in the combination of electronic signals communicated via transmission circuitry.

Figure 4:
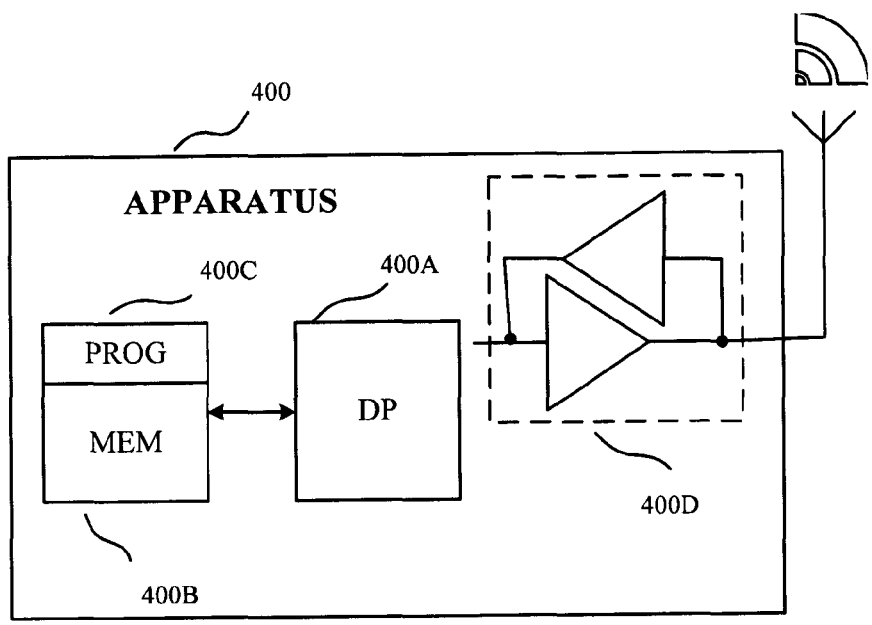
FIG. 4 is a simplified block diagram of another apparatus which is suitable for use in practicing exemplary embodiments of the present invention.

FIG. 4 is a simplified block diagram of another apparatus which is suitable for use in practicing exemplary embodiments of the present invention. In FIG. 4, the apparatus 400 such as user equipment, mobile phone, wireless terminal and etc. may be adapted for communicating with another apparatus (not shown) directly or through a network node such as base station, Node B, evolved Node B (eNB), control center, access point (AP) and/or the like. The apparatus can be any type of fixed terminal, mobile terminal, or portable terminal comprising desktop computers, laptop computers, handsets, stations, units, devices, multimedia tablets, Internet nodes, communicators, PDAs, or any combination thereof. In an exemplary embodiment, the apparatus 400 may comprise a data processor (DP) 400A, a memory (MEM) 400B that stores a program (PROG) 400C, and a suitable transceiver 400D for communicating with another apparatus, a network node, a server and so on. For example, the transceiver 400D may be an integrated component for transmitting and/or receiving signals and messages. Alternatively, the transceiver 400D may comprise separate components to support transmitting and receiving signals/messages, respectively. The DP 400A may be used for processing these signals and messages.

The PROG 400C is assumed to comprise program instructions that, when executed by the DP 400A, enable the apparatus to operate in accordance with the exemplary embodiments, as discussed above. That is, the exemplary embodiments of the present invention may be implemented at least in part by computer software executable by the DP 400A of the apparatus 400, or by hardware, or by a combination of software and hardware. The MEM 400B may be of any type suitable to the local technical environment and may be implemented using any suitable data storage technology, such as semiconductor based memory devices, flash memory, magnetic memory devices and systems, optical memory devices and systems, fixed memory and removable memory. The DP 400A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, techniques or methods described herein may be implemented in, as non-limiting examples, hardware, software, firmware, special purpose circuits or logic, general purpose hardware or controller or other computing devices, or some combination thereof.

It will be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), and etc. As will be realized by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

Although specific embodiments of the invention have been disclosed, those having ordinary skill in the art will understand that changes can be made to the specific embodiments without departing from the spirit and scope of the invention. The scope of the invention is not to be restricted therefore to the specific embodiments, and it is intended that the appended claims cover any and all such applications, modifications, and embodiments within the scope of the present invention.

What is claimed is:

1. A computer-implemented method, comprising:
    determining a context for a user, the determining including collecting context information and modeling collected context information for the user;
    adjusting automatically an authentication configuration for the user based at least in part on the modeled context, wherein different matching accuracies of an authentication algorithm for the same authentication input data are associated with respective authentication configurations; and
    performing an authentication of the user with the authentication configuration, wherein for the user under a safe context, the authentication is performed by decreasing a matching accuracy of the authentication algorithm, the safe context having a plurality of security sub-levels, wherein the matching accuracy of the authentication algorithm is selected in accordance with a security sub-level in the plurality of security sub-levels associated with the safe context determined for the user;
    wherein said decreasing the matching accuracy of the authentication algorithm further comprises:
        employing a normal recognition model of the authentication algorithm for recognizing authentication input data from the user; and
        determining the user as valid, in response to a match between at least a part of the recognized authentication input data and a corresponding part of authentication reference data of the authentication algorithm;
    wherein at least one of the determining, the adjusting, and the performing is performed by at least one processor of at least one computing system.

2. The method according to claim 1, wherein said determining the context for the user further comprises:
    detecting whether the user is under the safe context based at least in part on the context information.

3. The method according to claim 1, wherein the context further comprises at least one of a place, time, a background environment, a transportation status, and the time elapsed since a previous authentication becomes invalid.

4. The method according to claim 1, wherein the at least part of the recognized authentication input data further comprises a beginning part of the authentication input data, and wherein the user is determined as valid without waiting for recognizing the remaining part of the authentication input data.

5. The method according to claim 1, wherein said decreasing the matching accuracy of the authentication algorithm further comprises:
    replacing a normal recognition model of the authentication algorithm with an imprecise recognition model for recognizing authentication input data from the user; and
    determining the user as valid, in response to a match between the recognized authentication input data and authentication reference data of the authentication algorithm.

6. The method according to claim 1, further comprising:
    performing a re-authentication of the user under the same context by adjusting a current authentication configuration, in response to a failure of the authentication.

7. The method according to claim 1, wherein the authentication further comprises at least one of: a text-based authentication, a voice-based authentication, a pattern-based authentication, a graph-based authentication and a biometric-based authentication.

8. The method according to claim 5, wherein said replacing the normal recognition model of the authentication algorithm with the imprecise recognition model further comprises at least one of:
    modifying one or more parameters of the normal recognition model; and
    reducing one or more refining processes.

9. The method according to claim 6, wherein said adjusting the current authentication configuration further comprises:
    increasing a current matching accuracy of the authentication algorithm;
    or applying another authentication algorithm which is more reliable than the authentication algorithm.

10. An apparatus, comprising:
    at least one processor; and
    at least one memory including computer program code,
    the at least one memory and the computer program code configured to, with the at least one processor, cause the apparatus to perform at least the following:
        determining a context for a user, the determining including collecting context information and modeling collected context information for the user;
        adjusting automatically an authentication configuration for the user based at least in part on the modeled context, wherein different matching accuracies of an authentication algorithm for the same authentication input data are associated with respective authentication configurations; and
        performing an authentication of the user with the authentication configuration, wherein for the user under a safe context, the authentication is performed by decreasing a matching accuracy of the authentication algorithm, the safe context having a plurality of security sub-levels, wherein the matching accuracy of the authentication algorithm is selected in accordance with a security sub-level in the plurality of security sub-levels associated with the safe context determined for the user;
        wherein said decreasing the matching accuracy of the authentication algorithm further comprises:
            employing a normal recognition model of the authentication algorithm for recognizing authentication input data from the user; and
            determining the user as valid, in response to a match between at least a part of the recognized authentication input data and a corresponding part of authentication reference data of the authentication algorithm.

11. The apparatus according to claim 10, wherein said determining the context for the user further comprises:
    detecting whether the user is under the safe context based at least in part on the context information.

12. The apparatus according to claim 10, wherein the context further comprises at least one of a place, time, a background environment, a transportation status, and the time elapsed since a previous authentication becomes invalid.

13. The apparatus according to claim 10, wherein the at least part of the recognized authentication input data further comprises a beginning part of the authentication input data, and wherein the user is determined as valid without waiting for recognizing the remaining part of the authentication input data.

14. The apparatus according to claim 10, wherein said decreasing the matching accuracy of the authentication algorithm further comprises:
   replacing a normal recognition model of the authentication algorithm with an imprecise recognition model for recognizing authentication input data from the user; and
   determining the user as valid, in response to a match between the recognized authentication input data and authentication reference data of the authentication algorithm.

15. The apparatus according to claim 10, wherein the apparatus is caused to further perform:
   performing a re-authentication of the user under the same context by adjusting a current authentication configuration, in response to a failure of the authentication.

16. The apparatus according to claim 14, wherein said replacing the normal recognition model of the authentication algorithm with the imprecise recognition model further comprises at least one of:
   modifying one or more parameters of the normal recognition model; and
   reducing one or more refining processes.

17. The apparatus according to claim 15, wherein said adjusting the current authentication configuration further comprises:
   increasing a current matching accuracy of the authentication algorithm or
   applying another authentication algorithm which is more reliable than the authentication algorithm.

18. A computer program product comprising a non-transitory computer readable medium bearing computer program code embodied therein for use with a computer, the computer program code comprising:
   code for determining a context for a user, the determining including collecting context information and modeling collected context information for the user;
   code for adjusting automatically an authentication configuration for the user based at least in part on the modeled context, wherein different matching accuracies of an authentication algorithm for the same authentication input data are associated with respective authentication configurations; and
   code for performing an authentication of the user with the authentication configuration, wherein for the user under a safe context, the authentication is performed by decreasing a matching accuracy of the authentication algorithm, the safe context having a plurality of security sub-levels, wherein the matching accuracy of the authentication algorithm is selected in accordance with a security sub-level in the plurality of security sub-levels associated with the safe context determined for the user;
   wherein said decreasing the matching accuracy of the authentication algorithm further comprises:
      employing a normal recognition model of the authentication algorithm for recognizing authentication input data from the user; and
      determining the user as valid, in response to a match between at least a part of the recognized authentication input data and a corresponding part of authentication reference data of the authentication algorithm.

* * * * *